US011582311B2

(12) United States Patent
Saraf et al.

(10) Patent No.: US 11,582,311 B2
(45) Date of Patent: Feb. 14, 2023

(54) METHODS AND SYSTEM FOR ADAPTIVE AVATAR-BASED REAL-TIME HOLOGRAPHIC COMMUNICATION

(71) Applicant: Verizon Patent and Licensing Inc., Basking Ridge, NJ (US)

(72) Inventors: Rohit Shirish Saraf, Nashua, NH (US); Bhumip Khasnabish, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 241 days.

(21) Appl. No.: 16/917,227

(22) Filed: Jun. 30, 2020

(65) Prior Publication Data

US 2021/0409516 A1   Dec. 30, 2021

(51) Int. Cl.
*H04L 67/131* (2022.01)
*H04L 67/306* (2022.01)
*G06T 13/40* (2011.01)

(52) U.S. Cl.
CPC ............ *H04L 67/131* (2022.05); *G06T 13/40* (2013.01); *H04L 67/306* (2013.01)

(58) Field of Classification Search
CPC ........ H04L 67/38; H04L 67/306; G06T 13/40
See application file for complete search history.

(56) References Cited

U.S. PATENT DOCUMENTS

| 2015/0128121 | A1* | 5/2015 | Garcia | G06F 8/65 |
| | | | | 717/170 |
| 2019/0141593 | A1* | 5/2019 | Wei | H04W 76/11 |
| 2019/0206128 | A1* | 7/2019 | Logan | H04N 21/21805 |
| 2019/0251287 | A1* | 8/2019 | Bilotta | G06F 21/6245 |
| 2019/0339847 | A1* | 11/2019 | Scapel | G06T 19/20 |

* cited by examiner

Primary Examiner — Sherrod L Keaton

(57) ABSTRACT

Systems and methods provide an adaptive avatar-based real-time holographic communication service. End devices implement a customized avatar for holographic communications. With the assistance of a network edge platform, a user's facial motions and gestures are extracted in real time and applied to the customized avatar in the form of an augmented-reality-based or virtual-reality-based holographic entity. When a connection to the network edge platform is interrupted or not available, a master holographic entity provides a graceful fallback to a less resource-intensive avatar presentation using, for example, a user's prerecorded motions as a basis for rendering avatar movement. The customized avatar may be automatically adjusted/altered depending on with whom a user is communicating (e.g., a friend vs. a business associate) or a purpose for the communication (e.g., a professional meeting vs. a social activity).

20 Claims, 7 Drawing Sheets

METHODS AND SYSTEM FOR ADAPTIVE AVATAR-BASED REAL-TIME HOLOGRAPHIC COMMUNICATION

BACKGROUND

For multimedia communications, a person may prefer to use an alternate graphical representation or persona to represent themselves to others, commonly referred to as an avatar. The avatar may provide an alternative to a picture or video image of a user. In live video communications, an avatar may be implemented as an Augmented/Virtual Reality (AR/VR)-based holographic entity. Native computing resources of most mobile devices are insufficient to support generation of, and interactions with, an AR/VR-based holographic entity in real time.

DETAILED DESCRIPTION OF PREFERRED EMBODIMENTS

Figure 1:
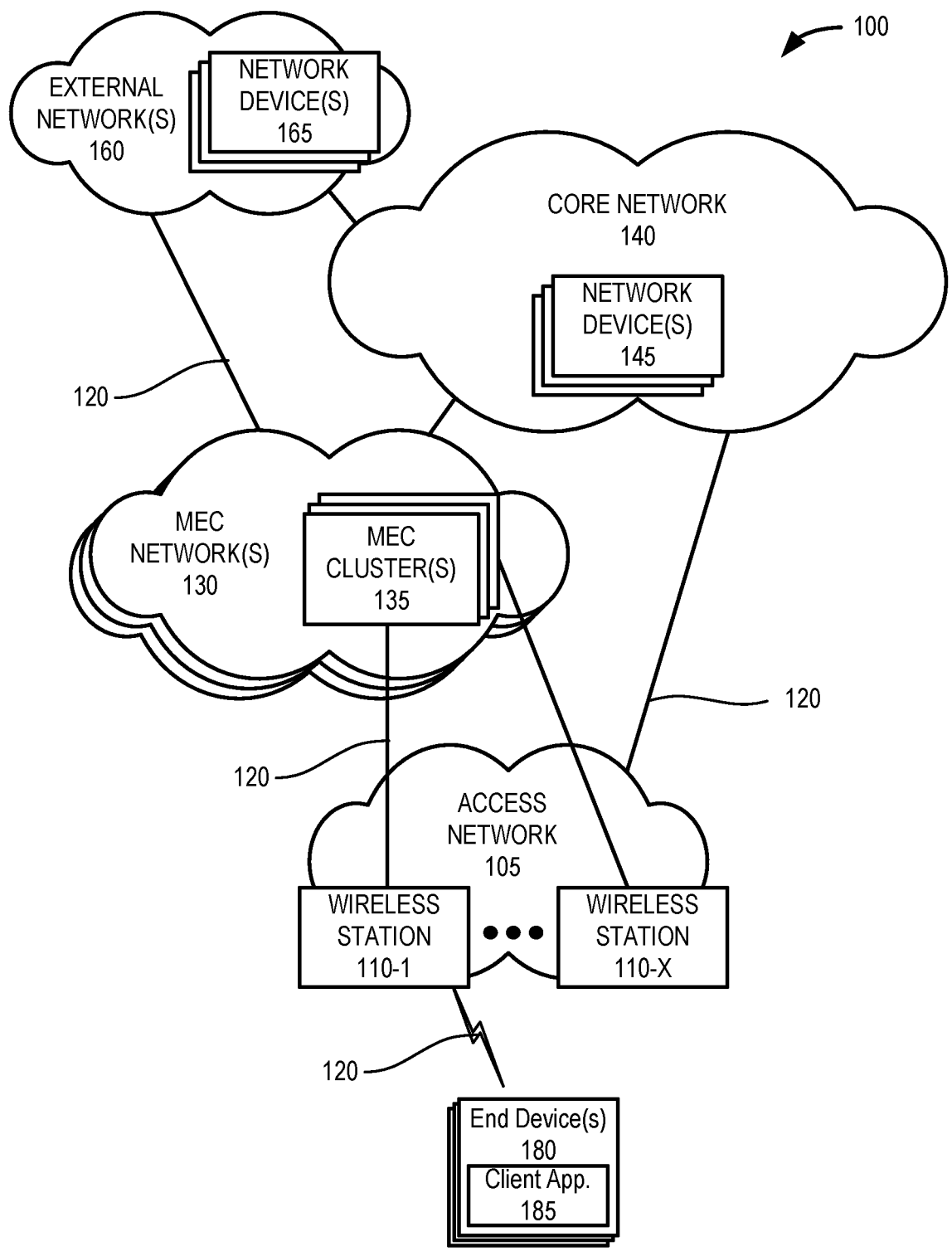
FIG. 1 is a diagram illustrating an exemplary network environment in which an adaptive avatar-based real-time holographic communication service described herein may be implemented.

The following detailed description refers to the accompanying drawings. The same reference numbers in different drawings may identify the same or similar elements. Also, the following detailed description does not limit the invention.

According to implementations described herein, an adaptive avatar-based real-time holographic communication service is provided. A network allows end devices to implement a customized avatar for holographic communications. A user's facial motions and gestures may be extracted in real time and applied to the customized avatar in the form of an augmented-reality- or virtual-reality-based holographic entity. The customized avatar may be used for person-to-person and person-to-group communications. The customized avatar may be automatically adjusted/altered depending on with whom a user is communicating (e.g., a friend vs. a business associate) or a purpose for the communication (e.g., a professional meeting vs. a social activity).

Computing resources of an end device (e.g., a smart phone, a tablet, VR device, etc.) are typically insufficient to support the graphics processing required for the adaptive avatar-based real-time holographic communication service. More powerful computing resources may be available via a cloud computing network. However, signal latency associated with traditional cloud-based network communications may prevent an adequate user experience. One enhancement made possible through new broadband cellular networks is the use of Multi-access Edge Compute (MEC) platforms (also referred to herein as Mobile Edge Compute platforms). The MEC platforms allow high network computing loads to be transferred onto edge servers.

Customer applications (or "apps") running on user's end devices can take advantage of MEC compute resources to provide enhanced services. For example, an application may offload compute tasks to a MEC platform that can provide services faster than other cloud-based services or a local processor in the end device. Depending on the location of the edge servers relative to the point of attachment (e.g., a wireless station for an end device), MEC platforms can provide various services and applications to end devices with minimal latency. MEC platforms may use processors with virtual machines that may be scaled and reallocated to provide different services to end devices. Generally, cloud-based services offer sufficiently fast data transfer for many customer applications. MEC-based services are generally more resource intensive and suited for use cases where real-time transfers (e.g., less than about 30 milliseconds, preferably less than about 13 milliseconds) are needed by the end device.

According to an implementation described herein, a master holographic entity may reside in a central location (e.g., cloud-based system), and a customized persona or customization elements may reside in near-edge or edge servers (e.g., MEC platforms). A client application on end devices may retrieve a customized avatar, based on current needs/environment, using a universal unique identifier (UUI) and assuming an opt-in/certificate pre-exists. For simplicity, the UUI can be a globally identifiable and routable mobile phone number, for example. Facial motions and gestures may be extracted by the end device in real time and applied to the customized avatar that is retrieved based on the UUI. The systems and methods described herein may identify the real-time resource capability of the end device and of the various network resources to determine where the computing for holographic rendering is done and which resources are used. When edge-based communications are interrupted or not available, the master holographic entity may provide a graceful fallback to a less resource-intensive avatar presentation using, for example, a user's prerecorded motions as a basis for rendering avatar movement. The persona can be adjusted based on with whom the avatar is communicating and the purpose of communication that is planned or in progress. For example, a person's avatar in a professional discussion setting may be different from the avatar in a happy hour setting with the same attendees.

FIG. 1 illustrates an exemplary environment 100 in which an embodiment of the adaptive avatar-based real-time holographic communication service may be implemented. As illustrated, environment 100 includes an access network 105, one or more local MEC networks 130, a core network 140, and one or more external networks 160. Access network 105 may include wireless stations 110-1 through 110-X (referred to collectively as wireless stations 110 and generally as wireless station 110). Each MEC network 130 may include MEC clusters 135 (e.g., a group of configurable network/computing devices); core network 140 may include network devices 145; and external network 160 may include network devices 165. Environment 100 further includes one or more end devices 180.

The number, the type, and the arrangement of network device and the number of end devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between end devices 180 and the network devices. Environment 100 may be implemented to include wired, optical, and/or wireless communication links among the network devices and the networks illustrated. A communication link may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 140.

Depending on the implementation, access network 105 may include one or multiple types of wireless stations 110. For example, wireless stations 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless node (e.g., a WiMax device, a hotspot device, etc.) that provides a wireless access service. According to some exemplary implementations, wireless stations 110 may include a combined functionality of multiple radio access technologies (e.g., 4G and 5G functionality).

MEC network 130 may include an end device application or service layer network (also referred to as an "application service layer network"). According to an implementation, MEC network 130 includes a platform that provides application services at the edge of a network. MEC networks 130 may be located to provide geographic proximity to various groups of wireless stations 110. In some instances, MEC clusters 135 may be co-located within a wireless station 110. In other instances MEC clusters 135 may be co-located with network devices 145 of core network 140.

MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.). As described further herein, MEC clusters 135 (also referred to as edge-compute clusters) may be used to implement a Holographic Proxy Server (HPS) for use in the adaptive avatar-based real-time holographic communication service.

Core network 140 may include one or multiple networks of one or multiple network types and technologies to support access network 105. For example, core network 140 may be implemented to include a next generation core (NGC) network for a 5G network, an Evolved Packet Core (EPC) of an LTE network, an LTE-A network, an LTE-A Pro network, and/or a legacy core network. Depending on the implementation, core network 140 may include various network devices 145 that may implement or host network functions, such as for example, a user plane function (UPF), an access and mobility management function (AMF), a session management function (SMF), a unified data management (UDM) function, an authentication server function (AUSF), a network slice selection function (NSSF), and so forth. According to other exemplary implementations, core network 140 may include additional, different, and/or fewer network devices than those described.

External network 160 may include one or multiple networks. For example, external network 160 may be implemented to include a cloud network, a service or an application-layer network, the Internet, an Internet Protocol Multimedia Subsystem (IMS) network, a Rich Communication Service (RCS) network, a packet-switched network, or other type of network that hosts an end device application or service. According to an implementation, external network 160 may provide cloud compute services for a specific service provider (e.g., Amazon® Web Services (AWS), Microsoft Azure®, IBM IOT Bluemix®, etc.) network. Depending on the implementation, external network 160 may include various network devices 165 that provide various applications, services, or other type of end device assets, such as servers (e.g., web, application, cloud, etc.), mass storage devices, data center devices, and/or other types of network services pertaining to various network-related functions. As described further herein, network devices 165 may implement a Holographic Master Entity Server (HMES) for use in the adaptive avatar-based real-time holographic communication service.

End device 180 includes a device that has computational and wireless communication capabilities. End device 180 may be implemented as a mobile device, a portable device, a stationary device, etc. For example, end device 180 may be implemented as a Mobile Broadband device, a smartphone, a computer, a tablet, a netbook, a wearable device, a game system, a drone, a virtual reality system, and augmented reality system, or some other type of wireless device. According to various exemplary embodiments, end device 180 may include or be connected to a video camera or other video/audio equipment. End device 180 may also be capable of presenting holographic communications (e.g., live three-dimensional avatar renderings).

End device 180 may be configured to execute various types of software (e.g., applications, programs, graphics processing, etc.). End device 180 may support one or multiple RATs (e.g., 4G, 5G, etc.), one or multiple frequency bands, dual-connectivity, and so forth. Additionally, end device 180 may include one or multiple communication interfaces that provide one or multiple (e.g., simultaneous or non-simultaneous) connections via the same or different RATs, frequency bands, etc.

As described further herein, end device 180 may download, store, and/or register client application 185. Client application 185 may be a customer application used with the adaptive avatar-based real-time holographic communication service. Client application 185 may also be referred to herein as a Holographic Client Entity (HCE). As described further herein, client application 185 may be executed on end device 180 to selectively use MEC compute resources, particularly MEC compute resources that provide the adaptive avatar-based real-time holographic communication service. In other implementations (e.g., where end device 180 includes high processing capabilities), end device 180 may locally perform some functions described below in connection with MEC clusters 135. For example, if a high-capacity processing end device 180 (e.g., a gaming platform) is used as for an HCE, then compute resources of the end device 180 may be preferred for holographic communications, even though MEC resources are available (e.g., to conserve MEC resources based on projected use). In contrast, if a low-capacity processing end device 180 (e.g., AR glasses, a smart phone, etc.) is used for an HCE, MEC resources may always be preferred for high quality rendering and streaming holographic assets.

Access network 105 and/or core network 140 may implement interfaces that allow MEC network 130 to determine/specify information related to providing communications services to end devices 180. For example, the interfaces may allow MEC network 130 to determine a geographic location, network area, or another location identifier of an end device 180 (which may be useful in determining an appropriate MEC cluster 135 on which to deploy a MEC workload). The interfaces may also allow the MEC network 130 to determine operational characteristics of the communications path between a MEC cluster 135 and an end device 180 (e.g., expected one-way/round trip latency, congestion-related parameters, etc.). In some implementations, the interfaces may allow MEC network 130 to specify a desired communications environment for communications between a MEC cluster 135 and end device 180 (e.g., quality-of-service levels, network slice types, etc.) In some implementations the interface may be an application programming interface (API) that interacts with services in the access network 105 and/or core network 140 that provide requested information and provisioning services.

Figure 2:
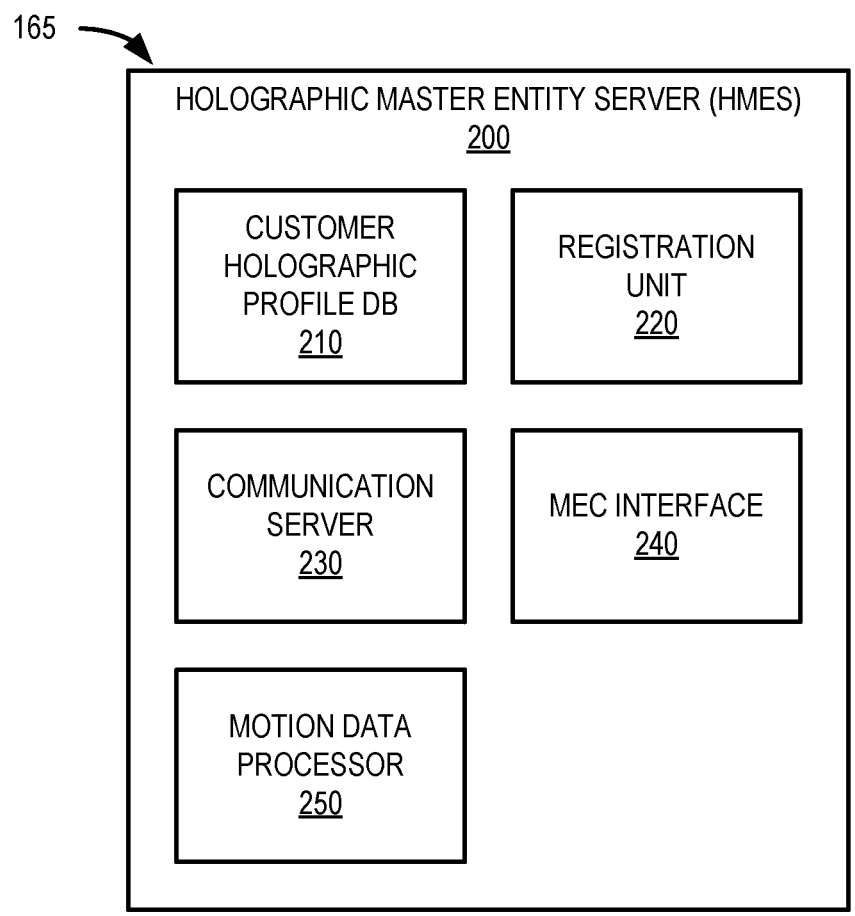
FIG. 2 is a block diagram illustrating logical components of a Holographic Master Entity Server (HMES) that may be implemented in the network environment of FIG. 1.

FIG. 2 is a block diagram illustrating logical components of a Holographic Master Entity Server (HMES) 200. HMES 200 may be may be executed, for example, on one or more of network devices 165 or MEC clusters 135. In some other implementations, one or more logical components of HMES 200 may be executed on an end device 180. As shown in FIG. 2, HMES 200 may include a customer holographic profile database 210, a registration unit 220, a mapping server 230, a MEC interface 240, and a motion capture processor 250.

Customer holographic profile database 210 may include a database or another memory component to store customer holographic profiles. For example, customer holographic profile database 210 may provide a central database to store customer holographic avatars and associate the avatars with a unique universal identifier (UUI) of a user. Customer holographic profile database 210 may also store other holographic profile data, including prerecorded motions, from a user, that can be applied to an avatar when, for example, a low latency connection is not available.

Registration unit 220 may register each user of client application 185, associating the user with an avatar and a UUI. Registration unit 220 may act as registrar for maintaining mapping of UUI to one or more avatars registered by a holographic client entity (e.g., application 185).

Communication server 230 may receive incoming holographic communication requests from client applications 185. Communication server 230 may manage compute resource selection and assignment for holographic communication request. Communication server 230 may determine if a calling party and one or more called parties for a holographic communication can be supported by a common (e.g., same) MEC cluster 135. For holographic communications that can be supported by a common MEC cluster 135, communication server 230 may initiate provisioning of a holographic proxy server (HPS) for the holographic communication on the MEC cluster 135. For holographic communications that cannot be supported by a common MEC cluster 135 (e.g., due to geographic spacing, network capacity, no MEC service, etc.), communication server 230 may default to less bandwidth- and/or processing-intensive holographic communications that can be managed in the cloud network through motion data processor 250, as described further herein.

According to an implementation, and based on communications between MEC cluster 135, HMES 200, and/or client application 185, communication server 230 may detect when user locations and network conditions support real-time and gracefully change between MEC-supported holographic communications (e.g., of higher quality) and cloud-based holographic communications (e.g., of lower quality). Additionally, communication server 230 may detect (e.g., via a MEC-RAN API and/or a MEC-cloud API) when network conditions change for the holographic communications due to congestions, end device mobility, etc. Communication server 230 may manage signaling trigger a graceful fallback from a MEC cluster 135, if a handover to another MEC cluster 135 is not available and/or preferable.

MEC interface 240 may manage provisioning and assignment of holographic service resources in MEC clusters 135. For example, MEC interface 240 may use a virtualization technology for provisioning holographic proxy servers in MEC clusters 135. In one implementation, a virtual HPS may be implemented using a virtual container along with other virtualization technology/architecture, such as a hypervisor, a container engine, and underlying hardware resources of a network device (e.g., a host device in MEC cluster 135). The virtualization technology and/or architecture support the creation, deletion, and intermediary operational state (also known as the "lifecycle") of a virtual network device and instance of the HPS. MEC interface 240 may detect hardware configurations at each MEC cluster 135, including, for example, the number of context switches available to support multiple holographic proxy server, etc.

MEC interface 240 may also direct use of resources in MEC networks 130 based on their current conditions. In one implementation, MEC interface 240 may receive a continuous stream of cluster utilization data from MEC clusters 135 and/or an orchestrator function within MEC network 130. The received data may include "request data," such as, for example, records of service requests, service terminations, and other requests (e.g., HTTP requests) from end devices 180/client applications 185 at any of MEC networks 130. MEC interface 240 may apply network traffic models to the request data, determine real-time conditions of MEC resources, and assign incoming holographic service requests to available MEC clusters 135.

MEC interface 240 may provide information for communication server 230 to determine if two or more client applications 185 (e.g., that request to participate in holographic communications) can be supported by a common MEC cluster 135. In addition to monitoring MEC resource loads, MEC interface 240 may identify latencies between, for example, the respective wireless stations 110 servicing end devices 180 and a potential servicing MEC cluster 135 to determine if real-time holographic service requirements can be met.

Compute and routing decisions may also be made based on user location and availability of edge compute service and also mobility. Other considerations include the availability of edge compute resources and services with an objective to maintain the quality of experience (QoE) satisfying the response and lag times, up/down link bandwidth, etc., requirements. In a mobility context, MEC interface 240 may further identify adjacent MEC clusters 135 that may be able to support real-time holographic communications if a current MEC cluster 135 becomes overloaded. According to an implementation, MEC interface 240 may allow adaptation of MEC clusters 135 and/or network devices 165 to handle changing in underlying network conditions, QoS, and user mobility/location and ensure optimum QoE.

Motion data processor 250 may receive real-time motion data from a client application 185 and map it to currently active holographic avatar. Motion data processor 250 may enable an avatar to mimic or replicate real-life gestures and expressions of a user. According to an implementation, motion data processor 250 may receive motion capture data in real time from client applications 185 and apply the data to the current active holographic communication avatars. For example, if network conditions (e.g., processing throughput, bandwidth, latency, etc.) at external network 160 support real-time holographic communications, motion data processor 250 may perform mapping functions and provide rendering data to a participating client application 185 without use of MEC network 130. According to another implementation, motion data processor 250 may receive motion capture data in real time from client applications 185 and apply prerecorded motions to simulate live action by the avatar. For example, motion data processor 250 may use a motion template to apply more limited motion capture input from client application 185 (e.g., low-resolution motion capture data) to render a predetermined gestures for the avatar.

Figure 3:
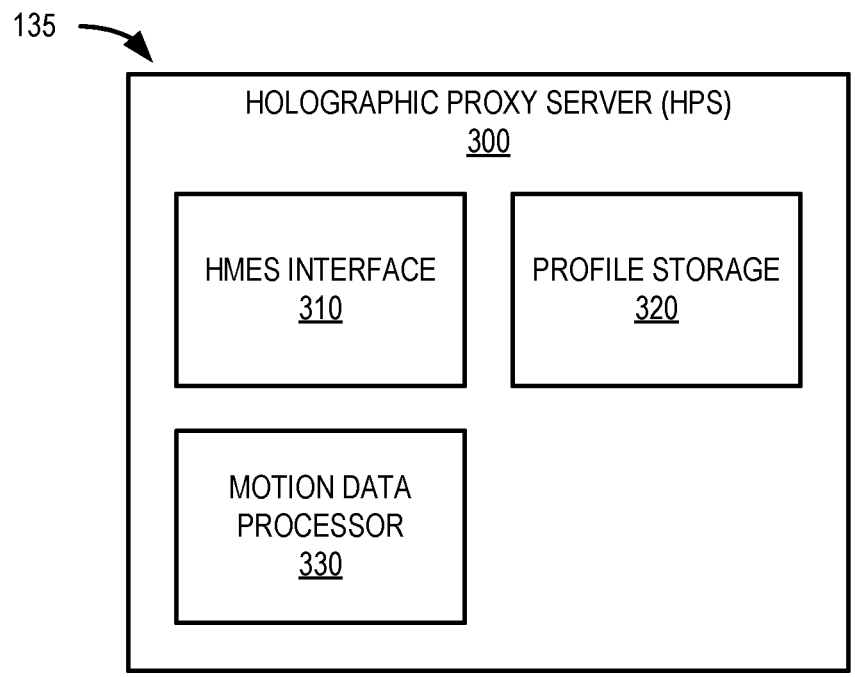
FIG. 3 is a block diagram illustrating logical components of a Holographic Proxy Server (HPS) that may be implemented in the network environment FIG. 1.

FIG. 3 is a block diagram illustrating logical components of a holographic proxy server (HPS) 300. HPS 300 may be implemented, for example, on MEC cluster 135 or external server 165. In some other implementations, one or more logical components of HPS 300 may be executed on an end device 180. As shown in FIG. 3, HPS 300 may include an HMES interface 310, profile storage 320, and a motion data processor 330. Generally, HPS 300 may be responsible for rendering of a holographic 3D avatar based on motion capture data provided from client applications 185 when network and user locations permit.

HMES interface 310 may receive instructions from HMES 200 to implement holographic communication server 230 functions for holographic communications between registered client applications 185. HMES interface 310 may receive holographic profiles for participating client applications 185.

Profile storage 320 may cache and store holographic profiles of participating client applications 185 in holographic communications. The holographic profiles may include holographic avatars, associated with each participant, to which motion capture data may be applied.

Motion data processor 330 may perform mapping of real-time motion data received from client applications 185 and map it to a currently active holographic avatar. Motion data processor 330 may be responsible for rendering of a holographic 3D avatar. Motion data processor 330 may also be used for other features such as changing an environment/landscape for an Avatar. Motion data processor 330 may provide rendering data to a participating client application 185 (e.g., a client application that did not generate the real-time motion data). Rendering data may include, for example, data for AR object rendering, avatar rendering, etc.

Figure 4:
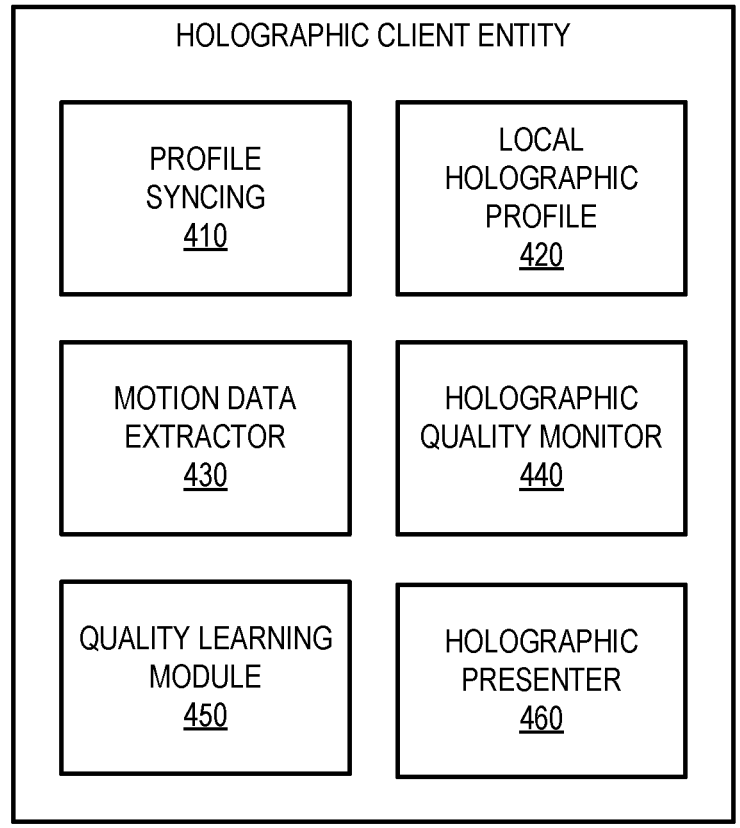
FIG. 4 is a block diagram illustrating logical components of the holographic client entity (HCE) that may be implemented in the network environment of FIG. 1.

FIG. 4 is a block diagram illustrating logical components of a holographic client entity (HCE) 400 that may be implemented on end device 180. According to an implementation, HCE 400 may correspond to, for example, client application 185 or a combination of end device 180 and client application 185 (e.g., a combination of hardware and software components). As shown in FIG. 4, HCE 400 may include profile synching 410, a local holographic profile 420, a motion data extractor 430, a holographic quality monitor 440, a quality learning module 450, and holographic presenter 460.

Profile synching 410 may perform an interface for user registration with HMES 200 and retrieve holographic profile updates for HCE 400. HCE 400 may initiate holographic communication with another HCE-enabled end device 180 or receive a request from another HCE-enabled end device 180 for holographic communication. Profile synching 410 may send UUI information, upon reception of the holographic communication invitation, to HMES 200 to retrieve the calling party's holographic avatar.

Holographic profile 420 may include information to conduct real-time holographic calling. Holographic profile 420 may be initially generated by HCE 400 and uploaded (e.g., via profile synching 410) to HMES 200 as part of an initial registration process. Holographic profile 420 may be updated by HMES 200 and/or HCE 400. Holographic profile 420 may include, for example, selected avatars, a user identifier, and stored motions associated with the user. Elements of local holographic profile 420 are described below in connection with FIG. 5.

Motion data extractor 430 may perform motion capture of a local user. In one aspect motion data extractor 430 may collect real-time motion data (e.g., gestures and facial motions), which may be forwarded to HMES 200 or HPS 300 during holographic communications. Once configured and authorized, motion data extractor 430 may capture input video frames from, for example, a camera associated with end device 180. For example, motion data extractor 430 may include a video application that collects or receives a video stream. Motion data extractor 430 may be configured to implement the adaptive avatar-based real-time holographic communication service. For example, using API calls, motion data extractor 430 may send motion capture data from the collected video to the assigned HPS 300 in MEC cluster 135.

Motion data extractor 430 may adapt the resolution of the motion capture data based on current network conditions or network connections. For example, motion data extractor 430 may use high resolution motion capture data when a MEC cluster 135 (e.g., providing an instance of HSP 300) is available. Conversely, motion data extractor 430 may use low resolution motion capture data (or even no motion capture data) when only higher latency network connections are available. In another aspect, motion data extractor 430 may record predetermined motions for an AR/VR template and save that as part of the consumer holographic profile (e.g., profile 420).

Holographic quality monitor 440 may evaluate holographic image quality of a received holographic image, according to one implementation. According to another implementation, holographic quality monitor 440 may evaluate holographic image quality of a sent holographic image, which may be a reflection of network conditions. Based on the holographic image quality and or network conditions, holographic quality monitor 440 may choose to provide high-resolution motion capture data or low resolution motion capture data to HMES 200 or HPS 300. For example, based on underlying network conditions, HCE 400 may choose between extracting and forwarding real-time motion data or instructing HMES 200 and/or HPS 300 to use or apply the predetermined motion template.

Quality learning module 450 may include an artificial intelligence (AI) or another learning component to detect a user's experience or quality of service associated with holographic communications. Quality learning module 450 may analyze network conditions and their impacts on HCE 400 over time.

Holographic presenter 460 may receive and present rendering data for another HCE 400 participating in holographic communications. For example, HPS 300 may send rendering data for a calling party's avatar to the called HCE 400. Holographic presenter 460 may use the rendering data to provide a real-time holographic avatar presentation on end device 180.

Figure 5:
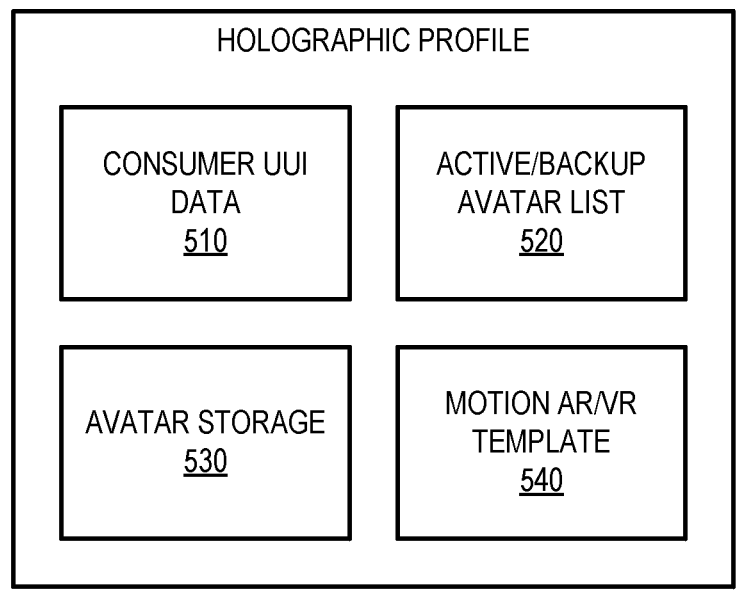
FIG. 5 is a diagram illustrating exemplary aspects of the holographic profile of FIG. 4.

FIG. 5 is a diagram illustrating exemplary aspects of the holographic profile 420. Referring to FIG. 5 holographic profile 420 may include consumer UUI data 510, an active/backup avatar list 520; avatar storage 530, and a motion AR/VR template 540.

Consumer UUI data 510 may include a unique identifier for a user. When a user logs in or accesses HCE 400 on end device 180, the user's UUI may be associated with HCE 400 for holographic communications.

Active/backup avatar list 520 may designate a status of an avatar as active or backup. Only one avatar may be active for user at a time, and motion data may be applied to the designated active avatar. HCE 400 may upload the avatar to HMES 200 as part of the registration process. According to an implementation, HCE 400 may support multiple avatars, with one avatar being active at a time and other avatars reserved as backups (e.g., for different purposes, groups, or times). Users may choose an Avatar to be currently active. According to another implementation, HCE 200 may be configured to select a default active avatar based on stored user preferences, such as different participating parties, times, or purposes.

Avatar storage 530 may include software code or widgets for an avatar. HCE 400 may receive/retrieve avatars from various sources and then register the avatars with HMES 200 as part of holographic profile 420. For example, a user may download an avatar to avatar storage 530 from a website or another application. According to an implementation, avatar storage 530 may also include selection criteria for the avatars in the holographic profile. For example, avatar selection criteria may include a particular location, an identity associated with a called HCE, or an indicated purpose of the holographic communications (e.g., based on an electronic calendar entry or meeting invitation, for example). The selection criteria may be applied by HMES 200, for example, at the start of holographic communications. In another implementation, avatar storage 530 may include a base avatar model and client variants. The base avatar model and variants may be stored in a central location (e.g., external network 160). Alternatively, the variants may be stored at a MEC cluster location or an end device separately from external network 160.

Motion AR/VR template 540 may include recorded motions, such as gestures and facial movements associated with a user. Motion AR/VR template 540 may be stored by HMES 200 and applied, for example, to an avatar when real-time motion capture is not supported. According to one implementation, HMES 200 may use motion AR/VR template 540 to apply limited input from HCE 400 (e.g., low-resolution motion capture data) to trigger a predetermined gesture for the avatar.

Although FIGS. 2-5 describe examples of logical components for some devices in network environment 100, in other implementations, different or different combinations of logical components may be used than those depicted in FIGS. 2-5. For example, one or more logical components of HMES 200 may perform one or more other tasks described as being performed by one or more other logical components of HPS 300 or HCE 400.

Figure 6:
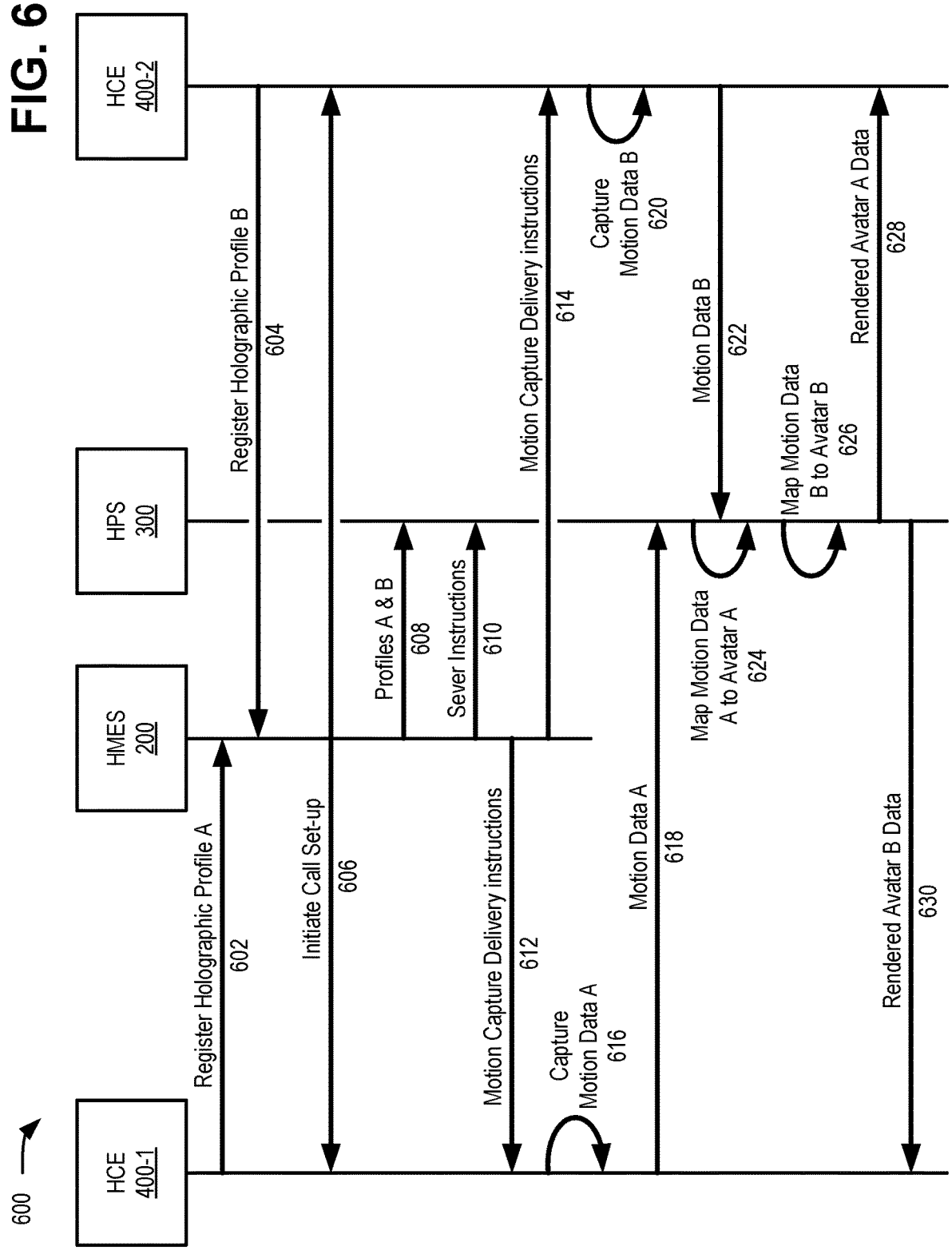
FIG. 6 is a diagram illustrating exemplary communications for the adaptive avatar-based real-time holographic communication service in a portion of the network environment of FIG. 1.

FIG. 6 is a diagram illustrating exemplary communications for implementing an adaptive avatar-based real-time holographic communication service in a portion 600 of network environment 100, according to an embodiment. Network portion 600 may include HMES 200, HPS 300, HCE 400-1 and HCE 400-2. FIG. 6 provides simplified illustrations of communications in network portion 600 and is not intended to reflect every signal or communication exchanged between devices.

As shown in FIG. 6, HCE 400-1 and HCE 400-2 (e.g., executed on respective end devices 180, not shown) may each register 602, 604 a holographic profile with HMES 200. For convenience the holographic profile for HCE 400-1 may be referred to as "Profile A," while the holographic profile for HCE 400-2 may be referred to as "Profile B." Each holographic profile may correspond, for example, to holographic profile 400 described above. HMES 200 may store each of profile A and profile B.

At some time after registrations 602 and 604, one of HCEs 400 (e.g., HCE 400-1) may initiate 606 holographic communications to the other HCE 400 (e.g., HCE 400-2). According to one implementation, the connection between HCE 400-1 and HCE 400-2 may be facilitated via HMES 200. While FIG. 6 illustrates a two-way holographic communications between HCE 400-1 and HCE 400-2, in other implementations, the adaptive avatar-based real-time holographic communication service may be used in a one-to-many environment or a multi-party call. HMES 200 may authenticate each user, HCE 400, or corresponding end device 180 to access the adaptive avatar-based real-time holographic communication service. From information exchanged during the communication set-up, HMES 200 may detect that both HCE 400-1 and HCE 400-2 are in the same geographic area and, thus, can be serviced by the same HPS 300 (e.g., instantiated in MEC cluster 135). For example, HMES 200 (e.g., MEC interface 240) may determine a general location of HCE 400-1 and HCE 400-2 based on the wireless station(s) 110 used to service the connection and confirm a local MEC cluster 135 has capacity to instantiate an HPS 200 for holographic communications between HCE 400-1 and HCE 400-2.

Based on the determination that HCE 400-1 and HCE 400-2 can be supported via a common HPS 300, HMES 200 may signal instructions to HPS 300, HCE 400-1, and HCE 400-2 to facilitate MEC-supported holographic communications. More particularly, HMES 200 may further provide instructions 608 to HPS 300 to act as a server for the holographic communications between HCE 400-1 and HCE 400-2. Instructions 608 may include, for example, configuration and/or provisioning information for MEC cluster 135 to generate/provide HPS 300 for HCE 400-1 and HCE 400-2. Instructions 608 may cause MEC cluster 135 to perform container provisioning and holographic service provisioning at the selected MEC location to configure HPS 300. HMES 200 may also retrieve the corresponding holographic profiles for HCE 400-1 and HCE 400-2 and send 610 the profiles (e.g., Profiles A and B) to HPS 300. HMES 200 may also provide instructions 612 and 614 to HCE 400-1 and HCE 400-2, respectively, to send motion capture data to HPS 300. Instructions 612 and 614 may include, for example, an IP address for HPS 300.

HCE 400-1 and HCE 400-2 may continuously monitor network conditions to evaluate connection status with HPS 300 and HMES 200. As shown at reference 616, HCE 400-1 may capture motion data (e.g., from live video generated by corresponding end device 180) and request additional resources (e.g., from core network 140/MEC network 130) for transferring data to conduct holographic communications. HCE 400-1 may provide motion data for the user of HCE 400-1 (e.g., motion data A 618) to HPS 300. Similarly, as shown at reference 618, HCE 400-2 may capture motion data (e.g., from live video generated by corresponding end device 180) and request additional resources (e.g., from core network 140/MEC network 130). HCE 400-2 may provide motion data for the user of HCE 400-2 (e.g., motion data B 620) to HPS 300.

HPS 300 may receive motion data A 618 and map 624 motion data A to the user's avatar defined in the user's holographic profile (e.g., "Avatar A" of profile A). HPS 300 may also receive motion data B 622 and map 626 motion data B to the other user's avatar defined in the other user's holographic profile (e.g., "Avatar B" of profile B). Based on motion data A, HPS 300 may generate and provide rendering data 628 for Avatar A to HCE 400-2, for presentation to the user of HCE 400-2. Similarly, based on motion data B, HPS 300 may generate and provide rendering data 630 for Avatar B to HCE 400-1, for presentation to the user of HCE 400-1.

According to implementations described herein, rendering data 628 and rendering data 630 may be provided within designated latency requirements for providing the adaptive avatar-based real-time holographic communication service. Developers may provide application settings (e.g., for HCE 400) that define latency requirements, fallback settings, and other configurations for particular applications. In the event that HCE 400-1 or HCE 400-2 detects that network conditions prevent HPS 300 from providing rendering data 628 and/or rendering data 630 within a maximum latency (e.g., about 30 ms or less), HCE 400-1 and HCE 400-2 may gracefully fall back to less bandwidth and/or processing intensive communications. Alternatively, as described above, HPS 300 (e.g., MEC cluster 135) may monitor the network conditions (using, for example, a MEC-RAN API) for the holographic communications and signal the conditions to HCE 400 and/or HPS 200 to trigger a graceful fallback.

Figure 7A:
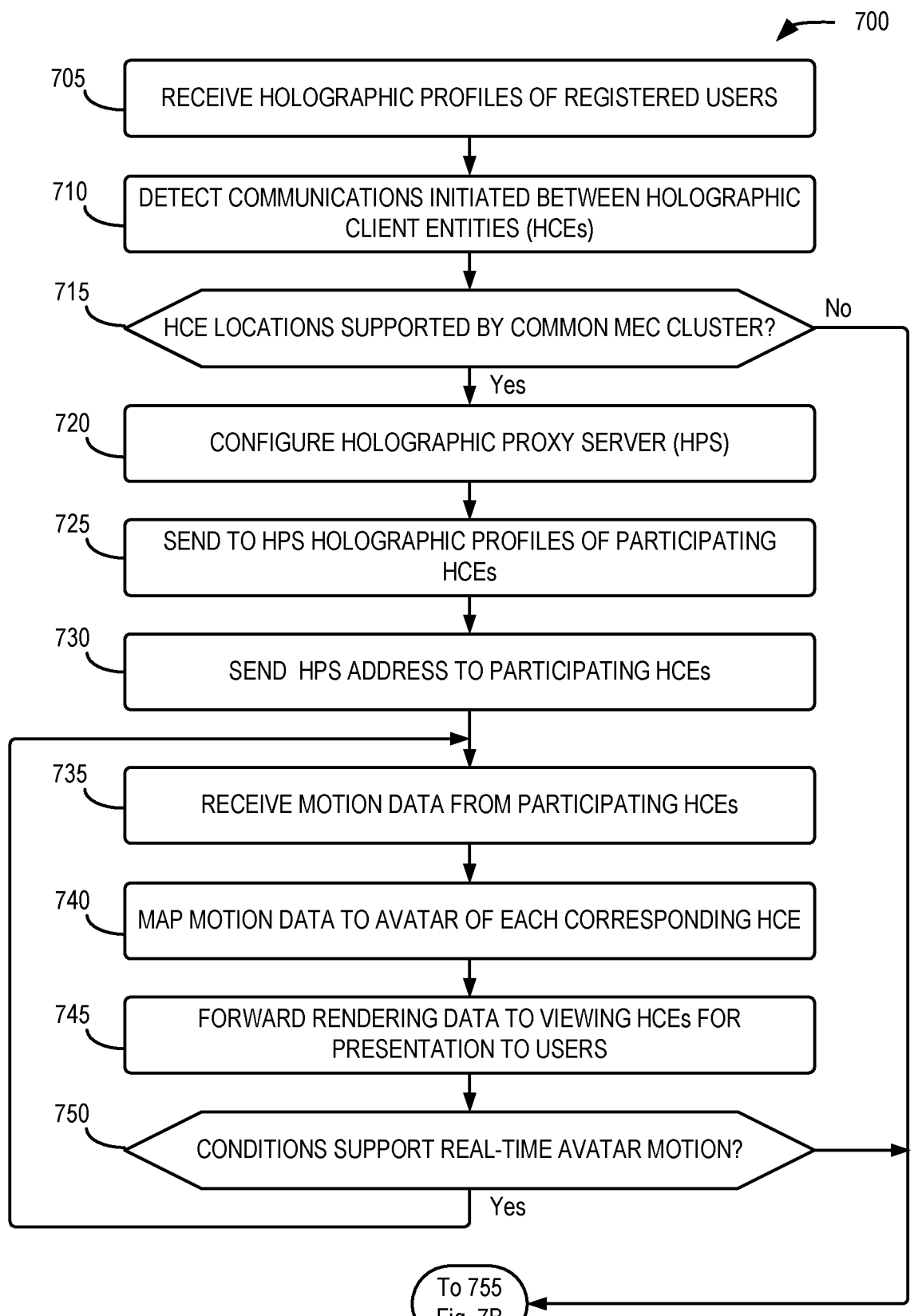
FIGS. 7A and 7B are flow diagram illustrating an exemplary process for providing an adaptive avatar-based real-time holographic communication service, according to an implementation described herein.
Figure 7B:
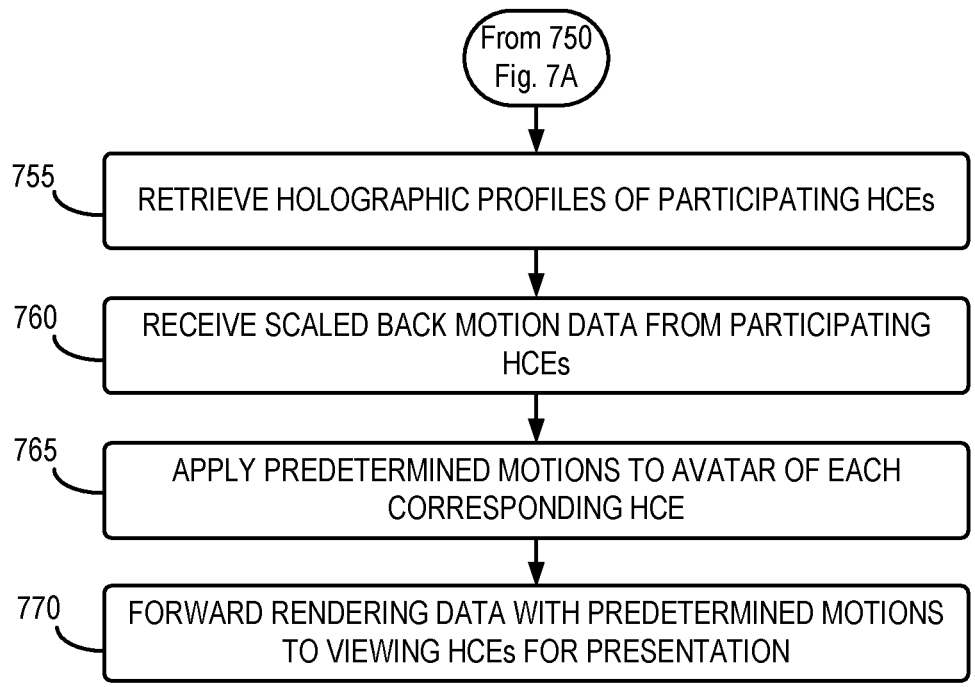

FIGS. 7A and 7B are flow diagrams illustrating an exemplary process 700 for providing the adaptive avatar-based real-time holographic communication service. In one implementation, process 700 may be performed by HMES 200. In another implementation, process 700 may be performed by HMES 200 in conjunction with HPS 300 on one or more other MEC cluster 135 devices in MEC network 130.

Process 700 may include receiving holographic profiles of registered users (block 705). For example, HCEs 400 may register with HMES 200 for the adaptive avatar-based real-time holographic communication service. The registration process may include each user creating a holographic profile (e.g., holographic profile 420) as described above, and providing the holographic profile to HMES 200.

Process 700 may also include detecting holographic communications initiated between HCEs (block 710), and determining if the HCEs are in locations supported by a common MEC cluster (block 715). For example, after registration, a user may later use an HCE (e.g., HCE 400-1) to initiate holographic communications with another HCE (e.g., HCE 400-2). HMES 200 may detect and process the holographic communications, including determining a service location of each HCE 400, identifying a UUI associated with each HCE, and detecting a holographic profile to use for each HCE 400. Based on the service location, HMES 200 may determine if each HCE 400 can be supported by a common (e.g., same) MEC cluster 135. For example, HMES 200 may attempt to identify an available MEC cluster 135 with sufficient processing capacity and latency expectations for both HCE 400-1 and HCE 400-2 to meet a latency requirement for real-time holographic communications. In another implementation, geographic proximity and/or wireless station locations may provide an initial indication of MEC cluster 135 availability.

If the HCEs are in locations supported by a common MEC cluster (block 715—Yes), process 700 may include configuring an HPS on the MEC cluster (block 720) and sending, to the HPS, holographic profiles for each HCE participating in the holographic communications (block 725). For example, HMES 200 may determine (e.g., by identifying the wireless stations 110 servicing HCEs 400) that one of MEC clusters 135 may service both HCEs 400, as it is in proximity to HCEs 400 to meet latency requirements for the holographic communications. Once HMES 200 identifies the MEC cluster, HMES 200 may provide instructions to provision an HPS (e.g., HPS 300) for the holographic communications on MEC cluster 135. HMES 200 may also send, to HPS 300, the corresponding holographic profiles associated with the participating HCEs 400.

Process 700 may further include sending a network address for the HPS to the participating HCEs (bock 730), and receiving motion data from the participating HCE (block 735). For example, HMES 200 may provide a network address (e.g., an IP address) for the HPS 300 that will be servicing the holographic communications for the participating HCEs. Each HCE (e.g., HCE 400-1 and HCE 400-2) may capture motion data of the respective users and forward the motion data to HPS 300, which may be received by HPS 300 for immediate processing.

Process 700 may additionally include mapping the motion data to an avatar for each corresponding HCE (block 740), and forwarding rendering data to the viewing HCEs for presentation to the users (block 745). For example, HPS 300 may map captured motion data from a first HCE 400 (e.g., calling HCE 400-1) to the active avatar of a corresponding holographic profile for HCE 400-1. At the same time, HPS 300 may map captured motion data from a second HCE 400 (e.g., called HCE 400-2) to the active avatar of a corresponding holographic profile for HCE 400-2. HPS 300 may forward rendering data to ECEs 400, to allow users to view respective avatars. Thus, rendering data for the calling party's avatar (e.g., HCE 400-1) may be forwarded from HPS 300 to HCE 400-2. Similarly, rendering data for the called party's avatar (e.g., HCE 400-2) may be forwarded from HPS 300 to HCE 400-1. According to an implementation, HPS 300 may receive, process, and forward the motion data in real time (e.g., with less than 30 ms latency).

Process 700 may also include determining if network conditions support real-time avatar motion (block 750). For example, HMES 200 may rely on an indication from an HCE 400 to determine if the quality of the real-time motion capture for holographic communications is adequate. If the network conditions continue to support real-time avatar motion (block 750—Yes), process 700 may return to process block 735 to receive more motion data from the participating HCEs 400.

If the HCEs are not in locations supported by a common MEC cluster (block 715—No) or if the network conditions no longer support real-time avatar motion (block 750—No), process 700 may include retrieving holographic profiles of participating HCEs (block 755, FIG. 7B), and receiving scaled back motion data from the participating HCEs (block 760). For example, HMES 200 may retrieve holographic profiles for HCE 400-1 and HCE 400-2 from database 210. Each HCE (e.g., HCE 400-1 and HCE 400-2) may identify that MEC resources are not available for the holographic communications and may, thus, provide a lower resolution capture motion data of the respective users. For example, lower resolution motion capture data may rely on a lower frame rate and/or fewer data points than for MEC-supported holographic communications. The lower resolution motion capture data may be forwarded to and received by HMES 200 for immediate processing.

Process 700 may further include applying predetermined motions to the avatar of each corresponding HCE (block 765) and forwarding rendering data with the predetermined motions to the respective viewing HCEs for presentation (block 770). For example, using the predetermined motions and AR/VR templates from the calling holographic profile (e.g., for HCE 400-1), HMES 200 may apply a predetermined motion to the active avatar for HCE 400-1 based on captured motion data from the HCE 400-1. At the same time, using the predetermined motions and AR/VR templates from the called holographic profile (e.g., for HCE 400-2), HMES 200 may apply a predetermined motion to the active avatar for HCE 400-2 based on captured motion data from the HCE 400-2. Thus, rendering data for the calling party's avatar (e.g., HCE 400-1) may be forwarded from HMES 200 to HCE 400-2. Similarly, rendering data for the called party's avatar (e.g., HCE 400-2) may be forwarded from HMES 200 to HCE 400-1. According to one implementation, the rendering data from HMES 200 may be sufficient to provide a graceful fallback for HCEs 400 if a network connection with MEC network 130 and HPS 300 is interrupted.

Figure 8:
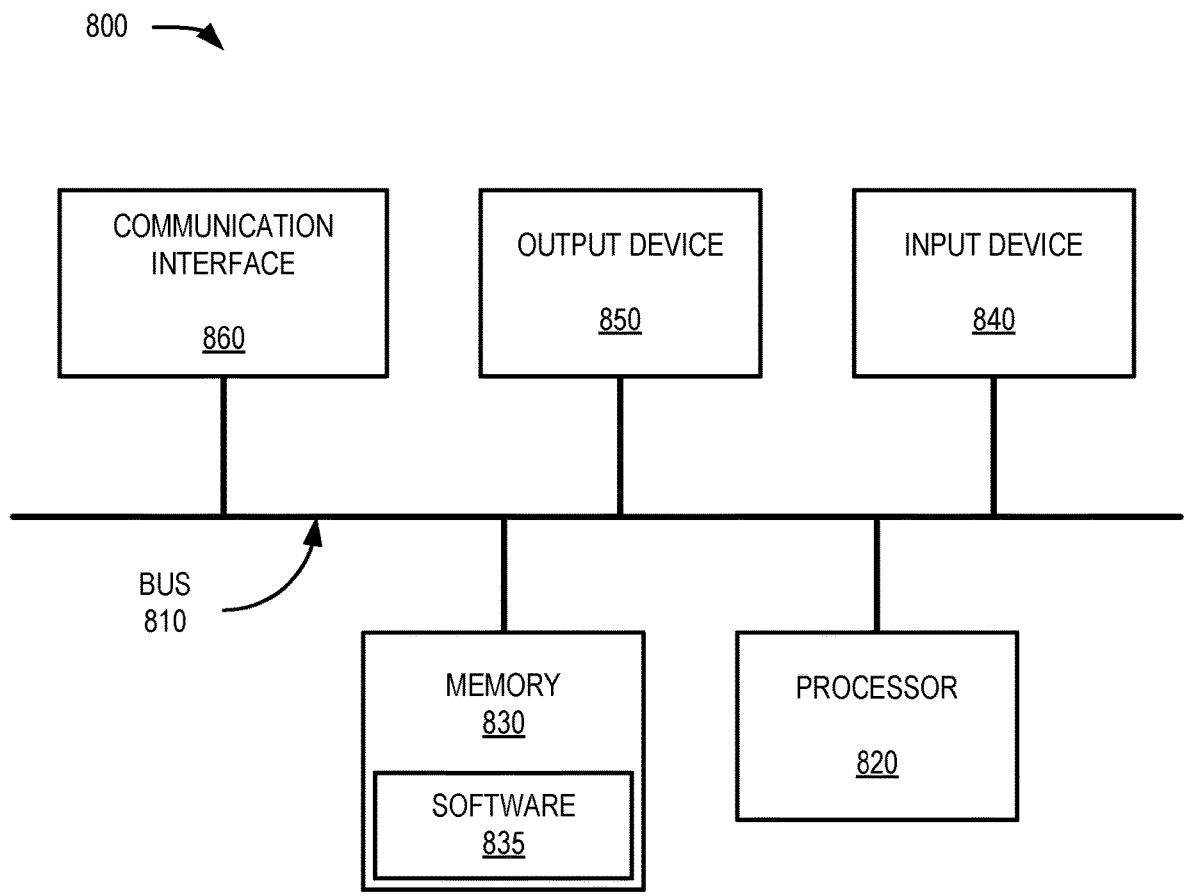
FIG. 8 is a block diagram illustrating exemplary components of a device that may correspond to one of the devices of FIGS. 1-5.

FIG. 8 is a block diagram illustrating exemplary components of a device that may correspond to one of the devices of FIGS. 1-6. Each of MEC cluster 135, network device 145, network devices 165, and end device 180 may be implemented as a combination of hardware and software on one or more of devices 800. As shown in FIG. 8, device 800 may include a bus 810, a processor 820, a memory 830, an input device 840, an output device 850, and a communication interface 860.

Bus 810 may include a path that permits communication among the components of device 800. Processor 820 may include a processor, a microprocessor, or processing logic that may interpret and execute instructions. Memory 830 may include any type of dynamic storage device that may store information and instructions, for execution by processor 820, and/or any type of non-volatile storage device that may store information for use by processor 820.

Software 835 includes an application or a program that provides a function and/or a process. Software 835 is also intended to include firmware, middleware, microcode, hardware description language (HDL), and/or other form of instruction. By way of example, when device 800 is an end device 180, software 835 may include client application 185 that uses MEC services as described herein.

Input device 840 may include a mechanism that permits a user to input information to device 800, such as a keyboard, a keypad, a button, a switch, touch screen, etc. Output device 850 may include a mechanism that outputs information to the user, such as a display, a speaker, one or more light emitting diodes (LEDs), etc.

Communication interface 860 may include a transceiver that enables device 800 to communicate with other devices and/or systems via wireless communications, wired communications, or a combination of wireless and wired communications. For example, communication interface 860 may include mechanisms for communicating with another device or system via a network. Communication interface 860 may include an antenna assembly for transmission and/or reception of RF signals. For example, communication interface 860 may include one or more antennas to transmit and/or receive RF signals over the air. In one implementation, for example, communication interface 860 may communicate with a network and/or devices connected to a network. Alternatively or additionally, communication interface 860 may be a logical component that includes input and output ports, input and output systems, and/or other input and output components that facilitate the transmission of data to other devices.

Device 800 may perform certain operations in response to processor 820 executing software instructions (e.g., software 835) contained in a computer-readable medium, such as memory 830. A computer-readable medium may be defined as a non-transitory memory device. A non-transitory memory device may include memory space within a single physical memory device or spread across multiple physical memory devices. The software instructions may be read into memory 830 from another computer-readable medium or from another device. The software instructions contained in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

Device 800 may include fewer components, additional components, different components, and/or differently arranged components than those illustrated in FIG. 8. As an example, in some implementations, a display may not be included in device 800. As another example, device 800 may include one or more switch fabrics instead of, or in addition to, bus 810. Additionally, or alternatively, one or more components of device 800 may perform one or more tasks described as being performed by one or more other components of device 800.

Systems and methods described herein provide an adaptive avatar-based real-time holographic communication service. End devices implement a customized avatar for holographic communications. With the assistance of a network edge platform, a user's facial motions and gestures are extracted in real time and applied to the customized avatar in the form of an augmented-reality-based or virtual-reality-based holographic entity. When a connection to the network edge platform is interrupted or not available, a master holographic entity provides a graceful fallback to a less resource-intensive avatar presentation using, for example, a user's prerecorded motions as a basis for rendering avatar movement. The customized avatar may be automatically adjusted/altered depending on with whom a user is communicating (e.g., a friend vs. a business associate) or a purpose for the communication (e.g., a professional meeting vs. a social activity).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 7A-7B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 820, etc.), or a combination of hardware and software (e.g., software 835).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 820) of a device. A non-transitory storage medium includes one or more of the storage mediums described in relation to memory 830.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
    receiving, by a network device, a first holographic profile for a first registered user associated with a first client entity and a second holographic profile for a second registered user associated with a second client entity;
    receiving, by the network device, a service request from the first client entity, wherein the service request initiates holographic communications with the second client entity;
    determining, by the network device, if the first client entity and the second client entity can be supported by a same edge-compute cluster;
    initiating, by the network device after determining that the first client entity and the second client entity can be supported by the same edge-compute cluster, provisioning of a holographic proxy server (HPS) for the holographic communications on the edge-compute cluster;

receiving, by the HPS, first captured motion data from the first client entity and mapping the first captured motion data to a first avatar from the first holographic profile; and sending, by the HPS, first rendering data for the first avatar to the second client entity for presentation by the second client entity.

2. The method of claim 1, wherein the first holographic profile includes recorded predetermined motions by the first registered user, and wherein the method further comprises:

retrieving, by the network device and when the first client entity and the second client entity cannot be supported by the same edge-compute cluster, the first holographic profile associated with the first client entity;

applying, by the network device, the recorded predetermined motions to the first avatar from the first holographic profile; and sending, by the network device, third rendering data for the first avatar to the second client entity for presentation by the second client entity.

3. The method of claim 1, further comprising:
sending, by the network device and to the HPS, the first holographic profile and the second holographic profile.

4. The method of claim 1, further comprising:
selecting, by the network device, the first avatar from a group of available avatars in the first holographic profile.

5. The method of claim 4, wherein the selecting is based on selection criteria in the first holographic profile and one or more of:
a location of the first client entity,
an identity associated with the second client entity, or
an indicated purpose of the holographic communications.

6. The method of claim 1, wherein the first holographic profile includes:
a universally unique identifier; and
at least one avatar for the first registered user.

7. The method of claim 1, further comprising:
receiving, by the HPS, second captured motion data from the second client entity and mapping the second captured motion data to a second avatar from the second holographic profile; and
sending, by the HPS, second rendering data for the second avatar to the first client entity for presentation by the first client entity.

8. The method of claim 1, further comprising sending, by the network device, an address for the HPS to the first client entity and the second client entity.

9. The method of claim 1, wherein determining if the first client entity and the second client entity can be supported by the same edge-compute cluster includes:
identifying an available edge-compute cluster from a multi-access edge compute (MEC) network, wherein the available edge-compute cluster is in sufficiently close geographic proximity to both the first client entity and the second client entity to meet a latency requirement for the holographic communications.

10. The method of claim 1, further comprising:
receiving, from the first client entity or the second client entity, a signal indicating low holographic quality, and generating rendering data for the first or second avatar using a predetermined motion capture template.

11. A system comprising:
a first network device, the first network device configured to:
receive a first holographic profile for a first registered user associated with a first client entity and a second holographic profile for a second registered user associated with a second client entity,
receive a service request from the first client entity, wherein the service request initiates holographic communications with the second client entity,
determine if the first client entity and the second client entity can be supported by a same edge-compute cluster,
initiate, after determining that the first client entity and the second client entity can be supported by the same edge-compute cluster, provisioning of a holographic proxy server (HPS) for the holographic communications on the edge-compute cluster; and
a second network device executing the HPS in the edge-compute cluster, the second network device configured to:
receive first captured motion data from the first client entity and map the first captured motion data to a first avatar from the first holographic profile, and
send first rendering data for the first avatar to the second client entity for presentation by the second client entity.

12. The system of claim 11, wherein the first holographic profile includes recorded predetermined motions by the first registered user, and wherein the first network device is further configured to:
retrieve, when the first client entity and the second client entity cannot be supported by the same edge-compute cluster, the first holographic profile;
apply, by the first network device, the recorded predetermined motions to the first avatar from the first holographic profile; and
send, by the first network device, third rendering data for the first avatar to the second client entity for presentation by the second client entity.

13. The system of claim 11, wherein the first network device is further configured to:
send, to the HPS, the first holographic profile and the second holographic profile.

14. The system of claim 11, wherein the first network device is further configured to:
select the first avatar from a group of available avatars in the first holographic profile.

15. The system of claim 11, wherein the first holographic profile includes:
a universally unique identifier,
a group of avatars for the first registered user,
a status indication for an active avatar of the group of avatars, and
prerecorded motion data of the first registered user.

16. The system of claim 11, wherein, when mapping the first captured motion data to a first avatar, the second network device is further configured to:
map the first captured motion data to the first avatar in real time.

17. The system of claim 11, wherein the second network device is further configured to:
generate rendering data for the first avatar using a predetermined motion capture template associated with the first client entity.

18. A non-transitory computer-readable storage medium storing instructions executable by a processor of a device in a network, which when executed cause the device to:
- receive a first holographic profile for a first registered user associated with a first client entity and a second holographic profile for a second registered user associated with a second client entity;
- receive a service request from the first client entity, wherein the service request initiates holographic communications with the second client entity;
- determine if the first client entity and the second client entity can be supported by a same edge-compute cluster;
- initiate, after determining that the first client entity and the second client entity can be supported by the same edge-compute cluster, provisioning of a holographic proxy server (HPS) for the holographic communications on the edge-compute cluster;
- retrieve, when the first client entity and the second client entity cannot be supported by the same edge-compute cluster, the first holographic profile associated with the first client entity;
- receive first captured motion data from the first client entity and mapping the first captured motion data to a first avatar from the first holographic profile;
- receive second captured motion data from the second client entity and mapping the second captured motion data to a second avatar from the second holographic profile;
- send first rendering data for the first avatar to the second client entity for presentation by the second client entity; and
- send second rendering data for the second avatar to the first client entity for presentation by the first client entity.

19. The non-transitory computer-readable storage medium of claim 18, wherein the first holographic profile includes:
- a universally unique identifier,
- at least one avatar for the first registered user, and
- prerecorded motion data of the first registered user.

20. The non-transitory computer-readable storage medium of claim 18, further comprising instructions which when executed cause the device to:
- receive, from the first client entity or the second client entity, a signal indicating a low holographic quality, and
- generate rendering data, based on the signal, for the first avatar using a predetermined motion capture template associated with the first client entity.

* * * * *